United States Patent
van Ketwich

[11] Patent Number: 6,072,475
[45] Date of Patent: Jun. 6, 2000

[54] TOUCH SCREEN

[75] Inventor: Johan Richard van Ketwich, Malmö, Sweden

[73] Assignee: Telefonaktiebolaget LM Ericsson, Stockholm, Sweden

[21] Appl. No.: 08/916,400

[22] Filed: Aug. 22, 1997

[30] Foreign Application Priority Data

Aug. 23, 1996 [SE] Sweden .................................. 9603061

[51] Int. Cl.[7] ...................................................... G09G 5/00
[52] U.S. Cl. ........................................... 345/173; 345/156
[58] Field of Search ................................. 345/173, 174, 345/179; 178/18.01, 18.03, 18.05, 18.06, 18.07; 245/156, 157, 179

[56] References Cited

U.S. PATENT DOCUMENTS

| | | | |
|---|---|---|---|
| 4,066,852 | 1/1978 | Zenk | 200/54 |
| 4,066,853 | 1/1978 | Zenk | 200/54 |
| 4,066,854 | 1/1978 | Zenk et al. | 200/54 |
| 4,066,855 | 1/1978 | Zenk | 200/54 |
| 4,085,302 | 4/1978 | Zenk et al. | 200/54 |
| 4,127,752 | 11/1978 | Lowthrop | 200/54 |
| 4,320,573 | 3/1982 | Larson | 29/622 |
| 4,394,643 | 7/1983 | Williams | 340/365 |
| 4,550,221 | 10/1985 | Mabusth | 178/18 |
| 4,566,001 | 1/1986 | Moore et al. | 340/711 |
| 4,598,181 | 7/1986 | Selby | 200/5 A |
| 4,791,252 | 12/1988 | Mayer | 200/52 R |
| 4,825,212 | 4/1989 | Adler et al. | 340/706 |
| 4,977,397 | 12/1990 | Kuo et al. | 340/710 |
| 5,376,946 | 12/1994 | Mikan | 345/157 |
| 5,402,151 | 3/1995 | Duwaer | 345/173 |
| 5,584,054 | 12/1996 | Tyneski et al. | 455/89 |
| 5,598,527 | 1/1997 | Debrus et al. | 345/173 |
| 5,748,185 | 5/1998 | Stephan et al. | 345/173 |

FOREIGN PATENT DOCUMENTS

| | | |
|---|---|---|
| 51-60702 | 6/1993 | Japan . |
| 8-212005 | 8/1996 | Japan . |

*Primary Examiner*—Richard A. Hjerpe
*Assistant Examiner*—Henry N. Tran
*Attorney, Agent, or Firm*—Burns, Doane, Swecker & Mathis, L.L.P.

[57] ABSTRACT

A touch screen 1111 having an active surface area 1112 which extends in three physical dimensions (x-, y- and z-dimensions) is provided. In the figure the active surface area has an U-shaped form. When a user slides his finger over the active surface area the tactile feedback gives him information about the position of the finger. The touch screen is activated when the active surface area senses a certain pressure from the finger. The use of the touch screen is facilitated especially when the user is on the move or when the touch screen is out of sight. Such use is common when operating hand-held terminals.

18 Claims, 9 Drawing Sheets

TOUCH SCREEN

TECHNICAL FIELD OF THE INVENTION

The invention refers to touch screens having active surface areas for sensing the presence of an object at and/or at a small distance from the active surface areas. The invention also refers to the use of such touch screens. Furthermore the invention refers to a method of manufacturing such touch screens

DESCRIPTION OF RELATED ART

Input devices for use in computer environments are known in the prior art. These are used to input data to a computer based system. Such data may be used to navigate a cursor on a display, to control the functions of a certain device or to simply input information to a system.

An input device may comprise a touch screen. A "touch" on a touch screen means that the touch screen senses the presence of an object such as a tip of a finger of a user or another object, for example a stylus, at and/or at a small distance from an active surface area of the touch screen. An output signal which, in general, is either an electrical or an optical signal is generated from the touch screen. The output signal may include information which is directly dependent on the position of the "touch" on the touch screen. In this case the output signal may include information of the x and y co-ordinates of the "touch" on the touch screen. Alternatively, the active surface area may be arranged into predetermined regions and, when a particular region is "touched", the output signal may then depend on a unique identification code which refers to that particular region. An input device comprising a touch screen may perform data processing on the output signal from the touch screen to provide a signal which is compatible with a predetermined format.

An input device comprising two conventional touch screens, each extending in two physical dimensions, is disclosed in the U.S. Pat. No. 4,550,221 (Mabusth "Touch Sensitive Control Device"). The touch screens sense a tip of a finger of a user at their active surface areas using a capacitive technology. The technique of using a capacitive technology as described in U.S. Pat. No. 4,550,221 is hereby incorporated by reference. The two touch screens are separated by a boundary in form of a raised line which is visible to the user and which can be felt by the tip of a finger of the user.

A touch control system for a cathode ray tube screen capable of recognizing "touch" positions along a predetermined co-ordinate axis on a three-dimensionally curved touch surface by using surface acoustic wave (SAW) energy for the touch control is disclosed in the U.S. Pat. No. 4,825,212 (Adler et al. "Arrangement for use with a touch Control System having a Spherically curved Touch Surface"). The three-dimensionally curved touch surface corresponds to the curved surface of the cathode ray tube screen. The technique of using surface acoustic wave energy for the touch control described in U.S. Pat. No. 4,825,212 is hereby incorporated by reference.

A curved touch screen for use with a cathode ray tube screen is disclosed in the U.S. Pat. No. 4,085,302 (Zenk et al. "Membrane-Type Touch Panel"). A substrate carrying a first set of conductive strips is overlaid by a resilient plastic membrane which carries a second set of conductive strips which are placed perpendicularly to the first set of conductive strips. Finger pressure on the touch screen can cause electrical contact between any one of the first set of strips and any one of the second set of strips. Similar touch screens are disclosed in the U.S. Pat. No. 4,066,852 (Zenk "Membrane-Type Touch Panel employing a Photo-resist Insulating Grid Anti-short Means"), U.S. Pat. No. 4,066,853 (Zenk "Membrane Type Touch Panel employing Piezoresistant Anti-short Means"), U.S. Pat. No. 4,066,854 (Zenk et al. "Membrane-Type Touch Panel employing Insulating Grid Anti-short Means") and U.S. Pat. No. 4,066,855 (Zenk "Vented Membrane-Type Touch Panel"). The technique of using conductive strips and a resilient membrane for the touch control described in U.S. Pat. No. 4,085,302, U.S. Pat. No. 4,066,852, U.S. Pat. No. 4,066,853, U.S. Pat. No. 4,066,854 and U.S. Pat. No. 4,066,855 is hereby incorporated by reference.

It is also known in the prior art to use touch screens using other kind of technologies such as discrete resistive, scanning infrared or digital resistive technologies. The presence of an object may also be detected by sensing the pressure from the object against the touch screen or by providing a light source in the touch screen and measuring the amount of light tunneling from the touch screen to the object at a certain position of the touch screen. Alternatively, the light source may be placed in the object.

It is known from the U.S. Pat. No. 4,566,001 (Moore et al. "Touch Strip Input for Display Terminal") to use touch screens which are placed at the edge of a display. It is also known to use a transparent touch screen which can be placed on top of a display as described, for example, in the U.S. Pat. No. 4,085,302 (Zenk et al. "Membrane-Type Touch Panel"). In these cases, a function of a system associated with a "touch" of a user at a predetermined region of the touch screen may be made dependent on a text or an image, for example an icon, which is shown on the display by the system at a position adjacent to or underneath the predetermined region.

In the U.S. Pat. No. 5,376,946 (Mikan "Computer Mouse Simulator Device") and U.S. Pat. No. 4,977,397 (Kuo et al. "Touch-control Computer House") a touch screen is used to realize an input device which by processing the output signal from the touch screen provides a signal which is compatible with a conventional computer mouse for use with Personal Computers (PC).

Whilst the known touch screens and input devices comprising touch screens described above function quite adequately in controlled environments, they do have a number of drawbacks.

The known touch screens and input devices comprising touch screens are difficult to operate. A user, who uses his tip of a finger to activate the touch screen, easily touches the active surface area of the touch screen at a position where the user did not intend to activate the touch screen. In many cases such an unintended activation gives as a result that a device or system connected to the touch screen or input device performs an unintended function. The user has no feedback of the position of the tip of his finger except from what he sees with his eyes. This problem becomes even more pronounced when the prior art touch screen or input device is used out of sight of the user and/or when the user is on the move (for example walking). This kind of use occur frequently in connection with, for example, the use of hand-held terminals such as mobile phones.

Furthermore, the known touch screens and input devices comprising touch screens occupy a relative large surface area especially when a number of predetermined regions are formed in the active surface area which may be needed for certain applications. Such an application may be a keyboard together with a cursor control functionality for use with a display. A keyboard may need 10 regions for the ten digits and the cursor control functionality may need 4 regions for moving the cursor "left", "right", "up" and "down". An input device for such an application must comprise at least 14 regions. Each region must have a size which is sufficiently large to be operated by the tip of a finger. Normally such a region is 10 mm×10 mm. The smallest surface area needed for the touch screen or the input device for the above mentioned application is therefore 1400 mm$^2$ (14×10×10). This corresponds to a square with a side of 37 mm. Such a relative large surface area of a touch screen or an input device is incompatible with the use on or in physically small devices. An example of a physically small device is a hand-held terminal such as a mobile phone. Another example of an application which requires a relative large surface area is a scroll bar functionality in a windows based graphical user interface. In this case it is sometimes not sufficient to provide four regions corresponding to "left", "right", "up" and "down". Instead there may be a need for providing a row and a column each comprising a plurality of regions. Each combination of a region on the row and a region on the column corresponds to a certain scroll position of the window in a horizontally and a vertically dimension, respectively.

SUMMARY

It is an object of the present invention to provide a touch screen and an input device comprising a touch screen which overcomes or alleviates the above mentioned problems.

A problem to be solved by the present invention is the difficulty in operating a touch screen or input device which comprises a touch screen. This problem is more pronounced when the touch screen or input device is used out of sight of the user and/or when the user is on the move (for example walking). This kind of use occur frequently in connection with for example the use of hand-held terminals.

A further problem to be solved by the present invention is that a conventional touch screen or input device comprising a touch screen occupies a large surface area. This problem is especially pronounced in the cases when a number of predetermined regions of the active surface area of a touch screen is needed on a physically small device. An example of a physically small device is a hand-held terminal.

The solution to the problems is to provide an input device comprising a touch screen or a touch screen the active surface area of which extends in three physical dimensions in such a way that a user receives a tactile feedback of the position of an object, such as the tip of his finger or a stylus, when he slides the object over the active surface area in at least one direction. The extension of the active surface area in three physical dimensions also results in that it is possible to provide a touch screen or an input device which occupies a small surface area on an application device. The size of the surface area of the present invention should be compared to the size of the surface area required in case the touch screen had extended in only two physical dimensions.

More particularly a solution to the problems mentioned above is to provide a touch screen which is formed to have e.g. a substantially U-shaped cross-section. The "inner" surface or the "outer" surface of the U-shaped structure makes up the active surface area of the touch screen. An alternative solution to the problems mentioned above is provide a touch screen which is formed to have a substantially round or elliptical shape in a top view perspective (the perspective of a user) which protrudes towards or away from a user in a ball-shaped or dent-shaped manner. The U-shape, the ball-shape or the dent-shape of the touch screen is given such dimensions that a user may slide his finger or a stylus over the active surface area in at least one direction and thereby, due to the tactile feedback from the U-shape, the ball-shape or the dent-shape, the user can be informed about the position of the finger or the stylus at the active surface area. The touch screen occupies a smaller surface area on an application device when the active surface area extends in three physical dimensions compared to when the active surface area extends in only two physical dimensions.

The purpose of the present invention is to provide a touch screen or an input device comprising a touch screen which is easy to use. Furthermore, it is a purpose of the present invention to provide a touch screen which is easy to use also when the touch screen is out of sight of a user and/or when a user is on the move (for example walking).

Furthermore, a purpose of the invention is to provide a touch screen or an input device comprising a touch screen which occupies a small surface area on or in the application it is used.

Furthermore, a purpose of the invention is to provide a touch screen which may be used on a physically small device. An example of a physically small device is a hand-held terminal such as a mobile phone.

An advantage of the touch screen of the present invention is that a user receives tactile feedback from touch screen when he slides an object, such as the tip of his finger or a stylus, over an active surface area of the touch screen. This tactile feedback reduces the risk that a user touches an unintended spot of the active surface area of the touch screen. This is especially helpful when the touch screen is operated out of sight from the user and/or when it is operated when the user is on the move (for example walking).

Another advantage is that the touch screen of the present invention occupies a small surface area when it is used on or in a device. This advantage is important especially when the touch screen is to be used on or in a physically small device. An example of a physically small device is a hand-held terminal such as a mobile phone.

BRIEF DESCRIPTION OF THE DRAWINGS

FIG. 6b schematically illustrates a cross-sectional view of a touch screen according to the third embodiment taken along the b—b line of FIG. 6a;

FIG. 7b schematically illustrates a cross-sectional view of a touch screen according to the fourth embodiment taken along the b—b line of FIG. 7a;

DETAILED DESCRIPTION OF EMBODIMENTS

Figure 1A:
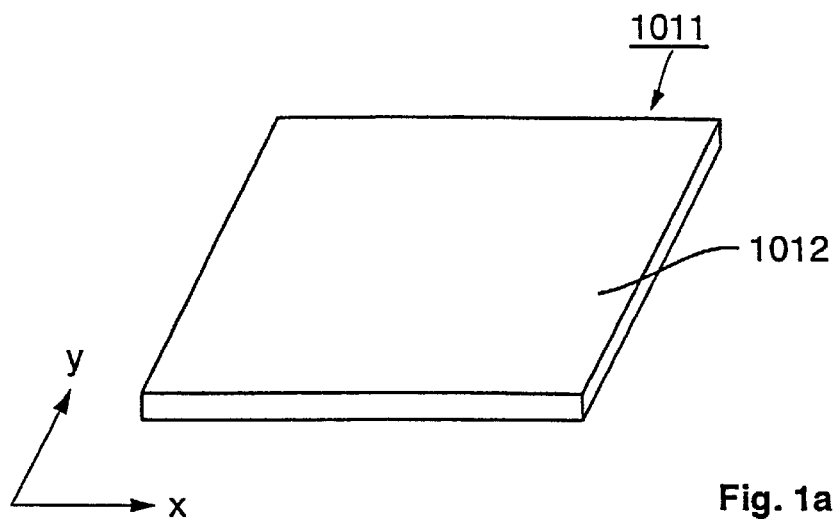
FIG. 1a schematically illustrates a view of a prior art touch screen.

FIG. 1 schematically illustrates a view of a conventional touch screen 1011 having an active surface area 1012 extending in two physical dimensions indicated by the x-direction and the y-direction. The touch screen is activated when it senses a "touch".

This occurs when the touch screen senses the presence of an object such as a tip of a finger of a user or a stylus at and/or at a small distance from its active surface area.

As has been discussed above, the presence of an object can be detected by using capacitive technology, a technology using surface acoustic wave energy and a technology using conductive strips and a resilient membrane. It is also known in the prior art to use touch screens using other kind of technologies such as discrete resistive, scanning infrared or digital resistive technologies.

The presence of the object may also be detected by sensing the pressure from an object against the touch screen or by providing a light source in the touch screen and measuring the amount of light tunneling from the touch screen to the object at a certain position of the touch screen. Alternatively, the light source may be placed in the object. The output signal is, in general, either an electrical or an optical signal. The output signal may include information which is directly dependent on the position of the "touch" on the touch screen. In this case the output signal may include information of the x and y co-ordinates of the "touch" on the touch screen. Alternatively, the active surface area may be arranged into predetermined regions and, when a particular region is "touched", the output signal may then depend on a unique identification code which refers to that particular region.

Figure 1B:
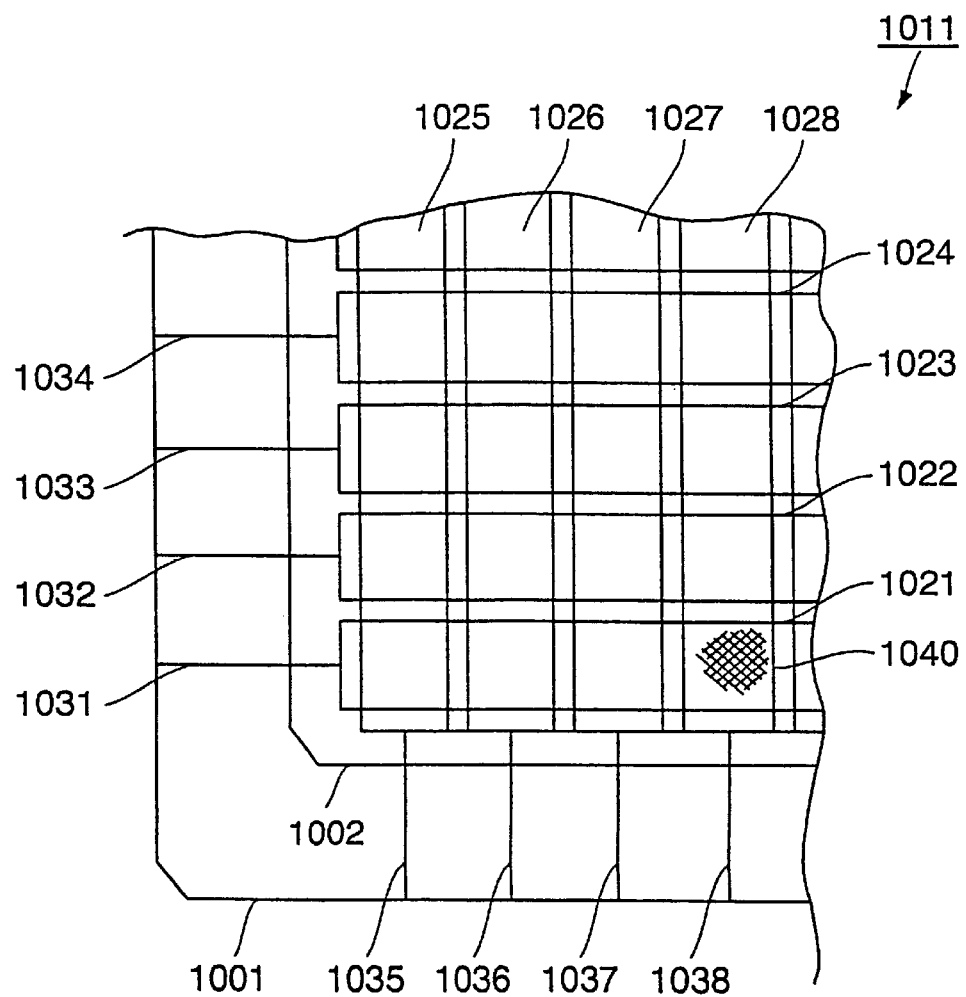
FIG. 1b schematically illustrates a top view of a corner portion of a prior art touch screen.

FIG. 1b schematically illustrates a top view of a corner portion of a prior art touch screen 1011. A first set of conductive strips 1021–1024 are formed on a substrate 1001 which has an insulating surface. Leads 1031–1034 are connected to the conductive strips 1021–1024, respectively. The leads 1031–1034 are used to electrically connect the conductor strips 1021–1024 with external electronics (not shown). An insulating grid 1040 is formed over the first set of conductive strips 1021–1024. The insulating grid 1040 may comprise a crosshatch of lines or strips formed of a photo-resist material, where each line is 0.13 mm wide, the thickness is 0.0025 mm and the lines are on 0.64 mm centers. A resilient insulating membrane 1002 is provided with a second set of conductive strips 1025–1028. Leads 1035–1038 are connected to the conductive strips 1025–1028, respectively. The leads 1035–1038 are used to electrically connect the conductor strips 1025–1028 with external electronics (not shown). The resilient insulating membrane 1002 comprising the second set of conductive strips 1025–1028 are assembled with the substrate 1001 which is carrying the first set of conductive strips 1021–1024 and the insulating grid 1040 in such a way that the second set of conductive strips 1025–1028 will face the insulating grid 1040 and that the individual strips of the first set of conductive strips 1021–1024 and the second set of the conductive strips 1025–1028 will be in a perpendicular relationship to each other. It is possible to make the touch screen 1011 transparent. In this case the substrate 1001, the first and second set of conductive strips 1021–1024, 1025–1028, the insulating grid 1040 and the resilient insulating membrane 1002 need to be transparent. The substrate may then be made of transparent glass or plastic, the first and second set of conductive strips 1021–1024, 1025–1028, of indium oxide, tin oxide or a combination of both oxides, the insulating grid 1040 of a transparent photo-resist material and the resilient insulating membrane 1002 of a transparent polyester film.

Figure 2:
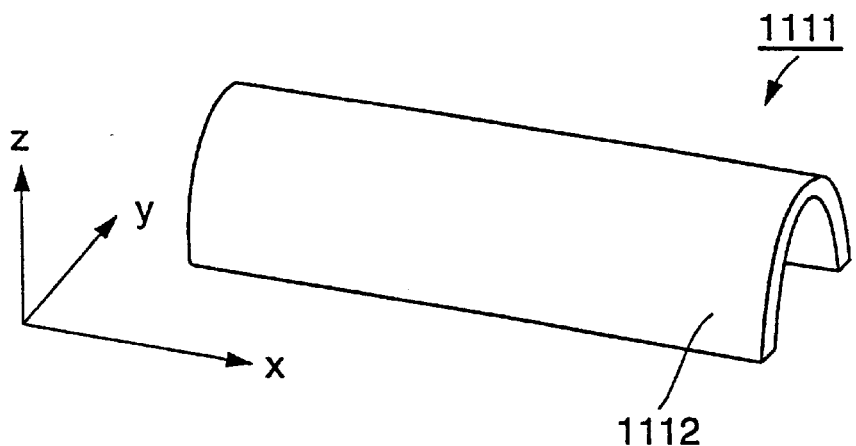
FIG. 2 schematically illustrates a view of a touch screen according to a first embodiment of the present invention.
Figure 3A:
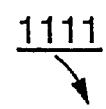
FIGS. 3a–3d schematically illustrate cross-sectional views of a touch screen according to a first embodiment of the present invention during operation.
Figure 3A:
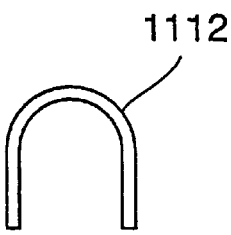
Figure 3B:
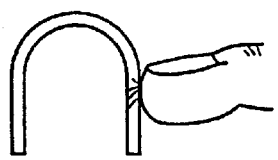
Figure 3C:
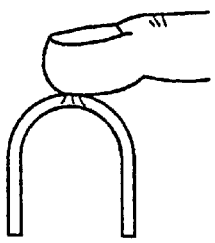
Figure 3D:
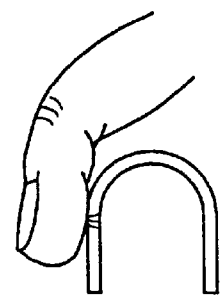
Figure 3E:
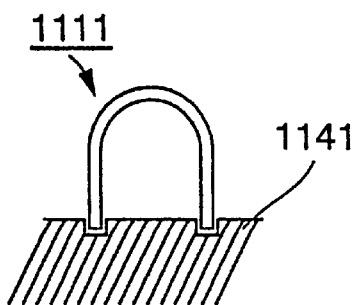
FIG. 3e schematically illustrates a cross-sectional view of a touch screen according to a first embodiment of the present invention when it has been assembled with an apparatus.

FIG. 2 schematically illustrates a perspective view of a touch screen 1111 according to a first embodiment of the present invention. FIG. 3a to FIG. 3d schematically illustrate a cross-sectional view of the touch screen 1111 in a plane which is perpendicular to the x-direction as defined in FIG. 2. FIG. 3e schematically illustrates a cross-sectional view of the touch screen 1111 when it has been assembled with an apparatus 1141. The touch screen 1111 is formed to have a substantially U-shaped cross-section as is shown in FIG. 3a to FIG. 3d. The touch screen 1111 has an active surface area 1112 at an "outer" surface of the U-shaped structure. The U-shape may be achieved by bending a conventional touch screen. FIG. 3a illustrates the touch screen 1111 when it is untouched. FIG. 3b and FIG. 3d illustrates the touch screen 1111 when it is experiencing the presence of an object on a first and a second "leg" of the U-shaped structure, respectively. FIG. 3c illustrates the touch screen 1111 when it is experiencing the presence of an object on the "curved" part of the U-shaped structure. FIG. 3e illustrates the touch screen 1111 when it has been assembled with an apparatus 1141. Two parallel grooves are first formed at the surface region of the apparatus 1141. The grooves are formed in such a way that at least a part of the "legs" of the U-shaped structure may be placed in the grooves. Next glue (not shown) is placed in at least one of the grooves. The "legs" of the touch screen 1111 are then placed in the grooves of the apparatus 1141.

Figure 4:
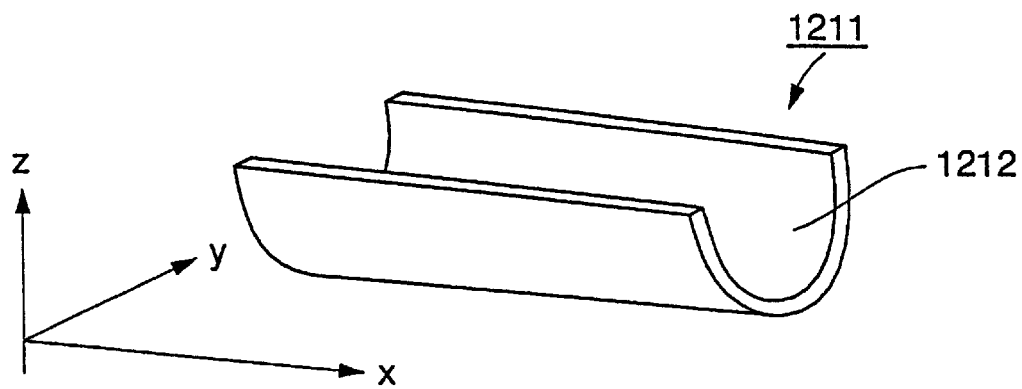
FIG. 4 schematically illustrates a view of a touch screen according to a second embodiment of the present invention.
Figures 5A, 5B, 5C, 5D:
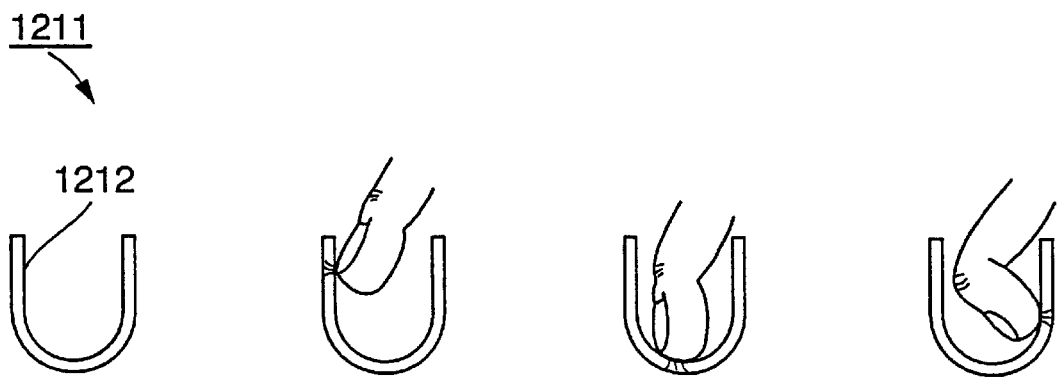
FIGS. 5a–5d schematically illustrate cross-sectional views of a touch screen according to a second embodiment of the present invention during operation.

FIG. 4 schematically illustrates a perspective view of a touch screen 1211 according to a second embodiment of the present invention. FIG. 5a to FIG. 5d schematically illustrate a cross-sectional view of the touch screen 1211 in a plane which is perpendicular to the x-direction as defined in FIG. 4. The touch screen 1211 is formed to have a substantially U-shaped cross-section as is shown in FIG. 5a to FIG. 5d. The touch screen 1211 has an active surface area 1212 at an "inner" surface of the U-shaped structure. The U-shape may be achieved by bending a conventional touch screen. FIG. 5a illustrates the touch screen 1211 when it is untouched. FIG. 5b and FIG. 5d illustrates the touch screen 1211 when it is experiencing the presence of an object on a first and a second "leg" of the U-shaped structure, respectively. FIG. 5c illustrates the touch screen when it is experiencing the presence of the object on the "curved" part of the U-shaped structure. In the example of FIG. 5b to FIG. 5d the above mentioned object is the tip of the finger of the user.

Figure 5E:
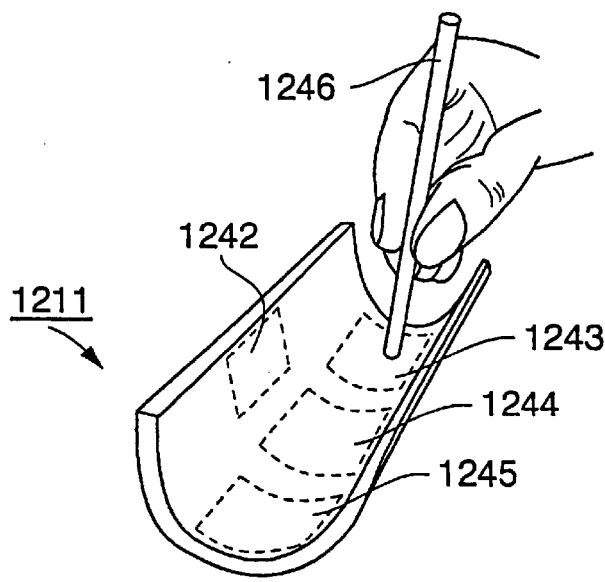
FIG. 5e schematically illustrates a perspective view of a touch screen according to a second embodiment of the present invention during operation.

The touch screens of the first and second embodiments discussed above may be used in menu navigation devices (not shown). In this case, the presence of the object at predetermined regions on the two "legs" of the U-shaped structure may correspond to the functionality "up" and "down", respectively, while the presence of the object at a predetermined region on the "curved" part of the U-shaped structure may correspond to the functionality "enter". Presence of the object at predetermined regions along the "U"-shaped structure adjacent to the regions mentioned above may correspond to the functionality "left" and "right", respectively. It should be understood that the position of the regions may be different and they may correspond to different functionalities without departing from the scope of the present invention. The touch screens of the first and second embodiments may also be used in data input devices or control devices (not shown). FIG. 5e schematically illustrates a perspective view of a touch screen according to the second embodiment of the present invention in which predetermined regions 1242–1245 have been indicated with dashed lines. In the example of FIG. 5e the above mentioned object is a stylus 1246.

In cases of the touch screens of the first and second embodiments the presence of an object may be detected by sensing a pressure of the object against the touch screen. The object may refer to the tip of a finger of a user.

The active surface areas 1112, 1212 of the touch screens 1111, 1211 discussed above in the first and second embodiments extend in three physical dimensions, i.e. in the dimensions of x, y and z as defined in FIG. 2 and FIG. 4. The U-shape of the touch screens 1111, 1211 are given such dimensions that a user may slide his finger over the active surface areas 1112, 1212, for example along the y-directions as defined in FIG. 2 and FIG. 4, and thereby, due to the tactile feedback from the U-shape, the user can be informed about the position of the finger at the active surface area.

In alternative embodiments, the U-shape of the active surface areas 1112, 1212 of the touch screens 1111, 1211 of the first and second embodiments are given such dimensions that a user may slide an object, such as a stylus (1246 in FIG. 5e), over the active surface area 1112, 1212, for example along the y-directions as defined in FIG. 2 and FIG. 4, and thereby, due to the tactile feedback the user gets from the U-shaped structure through the object, the user can be informed about the position of the object at the active surface area. In this case, the U-shaped structure may have a smaller size compared to what is possible when the tactile feedback is picked-up through the tip of the finger of the user The U-shape of the active surface areas 1112, 1212 of the touch screens 1111, 1211 of the first and second embodiments results in that it is possible to provide a touch screen or an input device which occupies a small surface area on an application device. A touch screen having an active surface area 1112, 1212 of a particular size occupies a smaller surface area in the x-y-plane when the active surface area 1112, 1212 extends in three physical dimensions (see FIG. 2 and FIG. 4) compared to when the active surface area 1112, 1212 extends in only two physical dimensions (see FIG. 1).

It should be understood that instead of a U-shaped structure as discussed above in the first and second embodiments, any three dimensional structures, such as V-shaped, rectangular shaped or tetrahedron shaped, may be used without departing from the scope of the present invention.

Figure 6A:
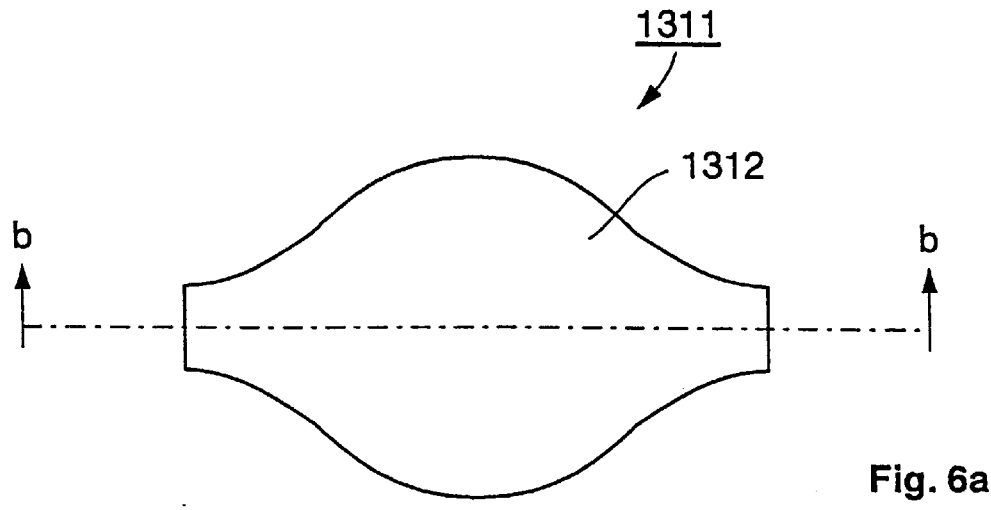
FIG. 6a schematically illustrates a view of a touch screen according to a third embodiment of the present invention.
Figure 6B:
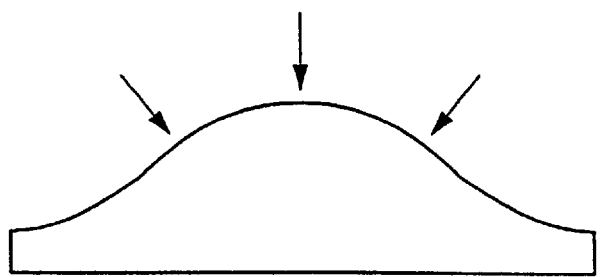

FIG. 6a schematically illustrates a top view of a touch screen 1311 according to a third embodiment of the present invention. FIG. 6b schematically illustrates a cross-sectional view along the b—b line of FIG. 6a. In this case the touch screen 1311 is formed to have a substantially round or elliptical shape in a top view perspective which protrudes towards a user, as is illustrated in FIG. 6b, in a ball-shaped manner. The touch screen 1311 has an active surface area 1312. The active surface area 1312 may either be the complete surface area as shown in FIG. 6a or only predetermined regions on this surface area. The touch screen 1311 according to the third embodiment enhances the joystick-alike features and simplifies functional choices in a computer input environment, especially when it is used in, for example, a data input device or a control device or a cursor navigation device.

Figure 7A:
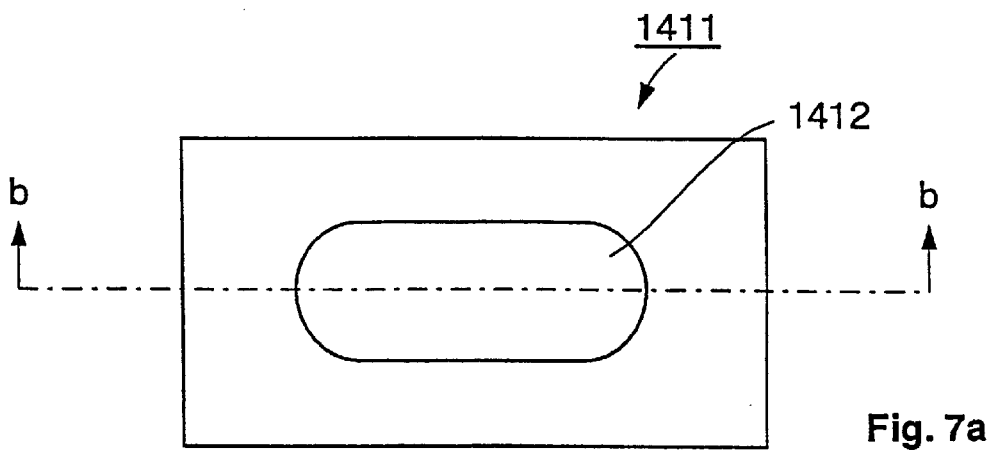
FIG. 7a schematically illustrates a view of a touch screen according to a fourth embodiment of the present invention.
Figure 7B:
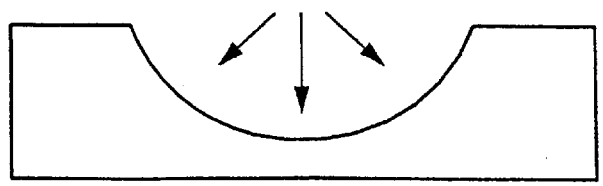

FIG. 7a schematically illustrates a top view of a touch screen 1411 according to a fourth embodiment of the present invention. FIG. 7b schematically illustrates a cross sectional view along the b—b line of FIG. 7a. In this case the touch screen 1411 is formed to have a substantially round or elliptical shape in a top view perspective which protrudes away from a user, as is illustrated in FIG. 7b, in a dent-shaped manner. The touch screen 1411 has an active surface area 1412. The active surface area 1412 may either be the complete surface area as shown in FIG. 7a or only predetermined regions on this surface area. Alternatively, the touch screen is only sensitive in the dent-shaped part. The touch screen 1411 according to the fourth embodiment enhances the joystick-alike features and simplifies functional choices in a computer input environment, especially when it is used in, for example, a data input device or a control device or a cursor navigation device.

In cases of the touch screens of the third or fourth embodiment the presence of an object may be detected by sensing a pressure of the object against the touch screen. The object may refer to the tip of a finger of a user.

The active surface areas 1312, 1412 of the touch screens 1311, 1411 discussed above in the third and fourth embodiments extend in three physical dimensions. The substantially round or elliptical shape of the touch screens 1311, 1411 in a top view perspective which protrudes towards or away from a user is given such dimensions that a user may slide his finger over the active surface areas 1312, 1412 and thereby, due to the tactile feedback from the round or elliptical shape, the user can be informed about the position of the finger at the active surface area.

In alternative embodiments, the substantially round or elliptical shape of the active surface areas 1312, 1412 of the touch screens 1311, 1411 of the third and fourth embodiments is given such dimensions that a user may slide an object, such as a stylus (not shown) over the active surface area 1312, 1412 and thereby, due to the tactile feedback the user gets from the round or elliptical shaped structure through the object, the user can be informed about the position of the object at the active surface area. In this case, the round or elliptical shaped structure may have a smaller size compared to what is possible when the tactile feedback is picked-up through the tip of the finger of the user.

The round or elliptical shaped structures of the active surface areas 1312, 1412 of the touch screens 1311, 1411 of the third and fourth embodiments results in that it is possible to provide a touch screen or an input device which occupies a small surface area on an application device. A touch screen having an active surface area 1312, 1412 of a particular size occupies a smaller surface area in the x-y-plane when the active surface area 1312, 1412 extends in three physical dimensions (see FIGS. 6 and FIGS. 7) compared to when the active surface area 1312, 1412 extends in only two physical dimensions (see FIG. 1).

The touch screens 1111, 1211, 1311, 1411 of either of the first, second, third or fourth embodiments may comprise an electrical arrangement corresponding to the electrical arrangement described above in conjunction with FIG. 1b.

Figure 8A:
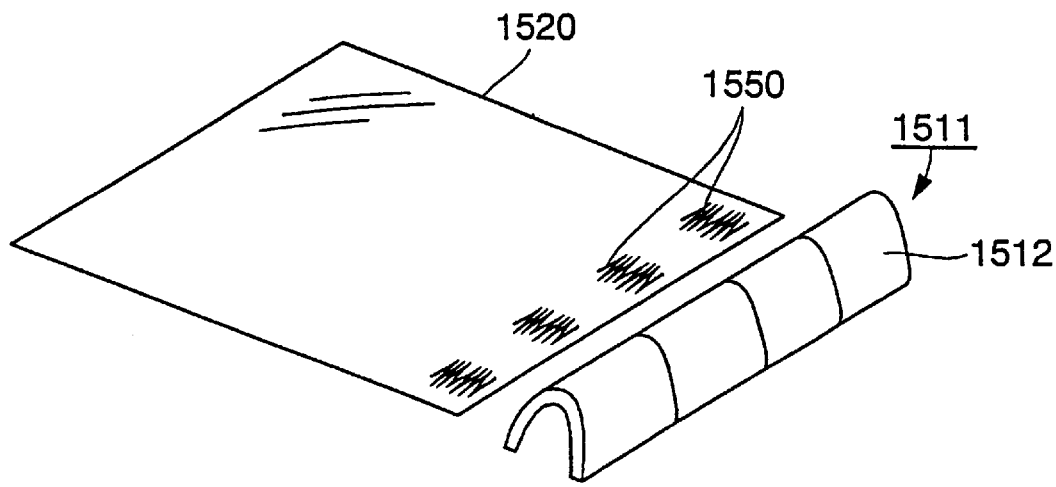
FIG. 8a schematically illustrates a view of a touch screen according to the fifth embodiment of the present invention.
Figure 8B:
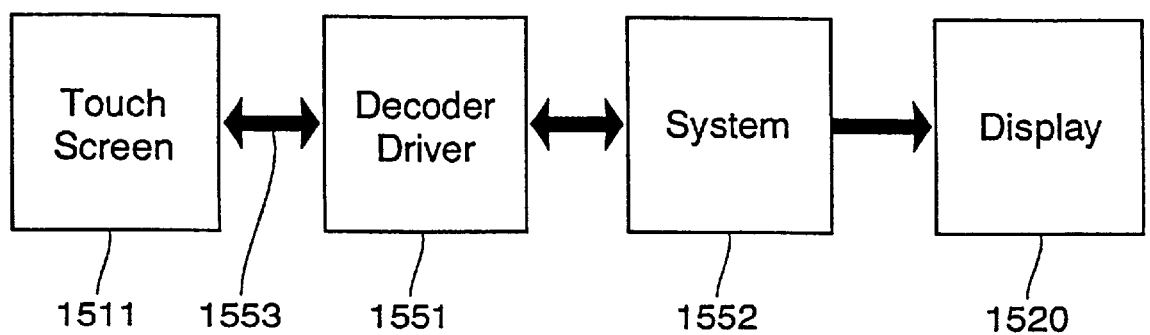
FIG. 8b illustrates a block diagram wherein a touch screen according to the fifth embodiment is used together with a system and a display.

FIG. 8a schematically illustrates a perspective view of a touch screen 1511 which is used with a system (not shown) comprising a liquid crystal display, LCD, 1520 according to a fifth embodiment of the present invention. A U-shaped touch screen 1511 similar to the touch screen of the first embodiment of the present invention is placed adjacent to the LCD 1520. A block diagram is shown in FIG. 8b. The touch screen 1511 is connected to an electrical circuit of the system 1552. In the case shown in FIG. 8b a separate decoder and/or driver unit 1551 is used. Furthermore, the LCD 1520 is connected to the system 1552. More particularly, the connectors of the touch screen 1553 may correspond to the leads 1031–1038 of FIG. 1b when the touch screen has been formed to have an electrical arrangement similar to the electrical arrangement as has been described above in conjunction with FIG. 1b.

The system 1552, which execute at least two functions, displays a number of icons 1550 on the display 1520. Each icon corresponds to one of the functions of the system 1552 and is displayed on the display 1520 at a position adjacent to a predetermined region of the U-shaped touch screen 1511. On the activation of the touch screen 1511 by a "touch" of a user on one of the predetermined regions, the function which corresponds to the icon adjacent to the "touched" predetermined region is executed by the system 1552. Possible adaptation of the signals between the touch screen 1511 and the system 1552 is carried out by the decoder and/or driver unit 1551. It should be noted that the same region of the touch screen may correspond to different functions of the system depending on which icon is shown by the system 1552 on the display 1520. It should be understood that any kind of displays may be used instead of an LCD.

In an alternative embodiment the touch screen may be placed on top of the display and the icons may be shown underneath the touch screen.

It should be understood that instead of an icon any image or text may be displayed by the system on the display 1520.

The presence of an object may be detected by sensing a pressure of the object against the touch screen and the object may refer to a finger of a user.

In an alternative embodiment, the U-shaped structure of the second embodiment, which is discussed above, may be used in combination with a LCD in accordance with the fifth embodiment.

Figure 9:
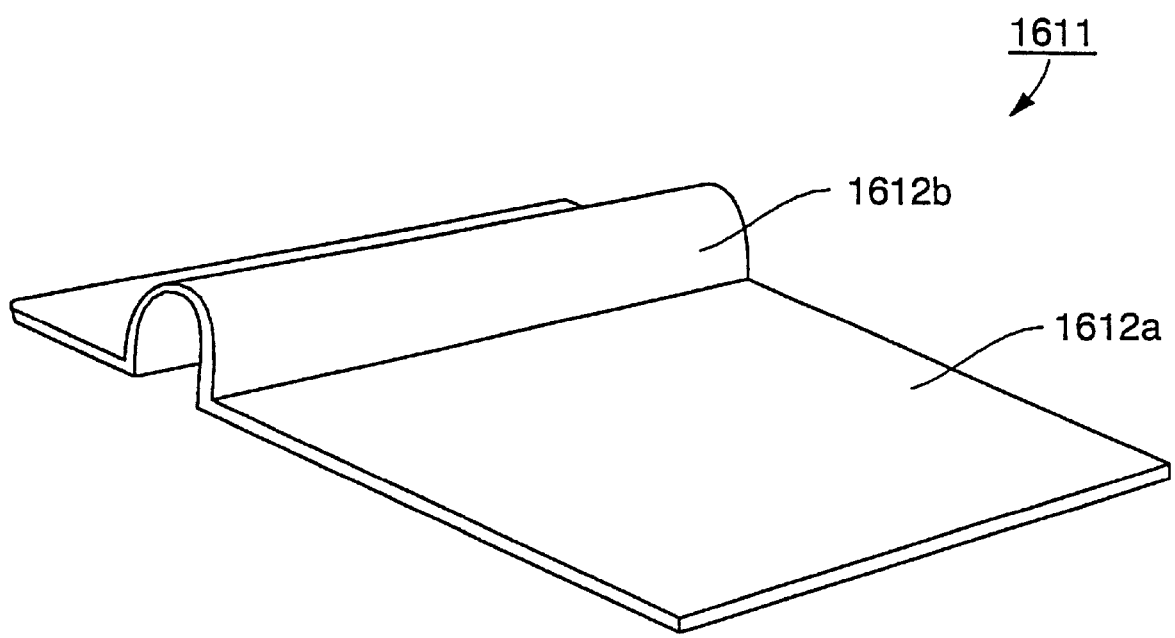
FIG. 9 schematically illustrates a view of a touch screen according to the sixth embodiment of the present invention.

FIG. 9 schematically illustrates a perspective view of a touch screen 1611 according to a sixth embodiment of the present invention. A U-shaped touch screen having an active surface area 1612a which is similar to the touch screen of the first embodiment of the present invention is formed as a part of a conventional touch screen having an active surface area 1612b. The touch screen 1611 allows the features of the touch screen of the present invention to be combined with the features of a conventional touch screen.

In an alternative embodiment, the U-shaped structure of the second embodiment, which is discussed above, may be formed as a part of a conventional touch screen in accordance with the sixth embodiment.

It should be understood that also the touch screens of the third and of the fourth embodiments of the present invention may be combined with a conventional touch screen in accordance with the sixth embodiment without departing from the scope of the present invention.

Figure 10A:
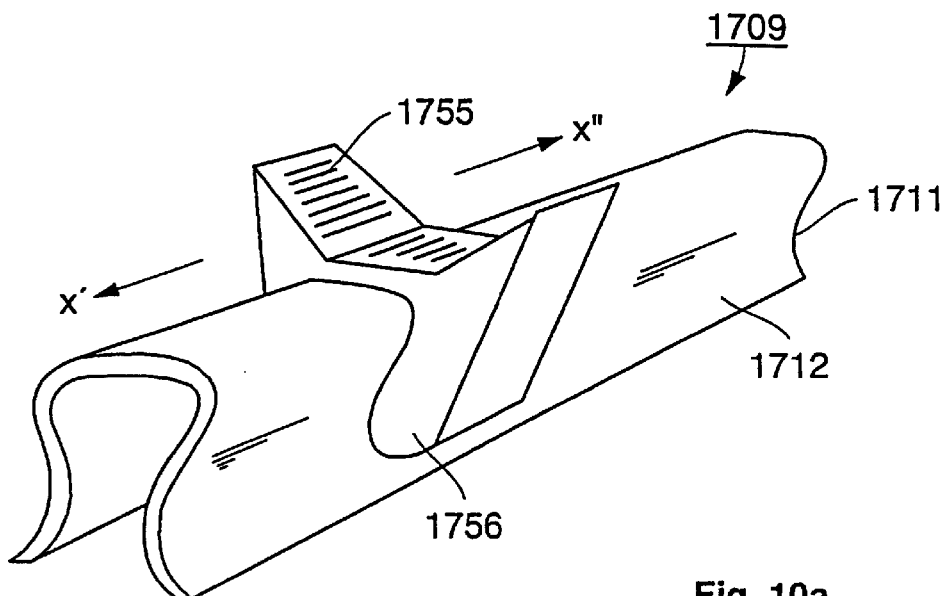
FIG. 10a schematically illustrates a perspective view of a touch screen device according to the seventh embodiment of the present invention.
Figure 10B:
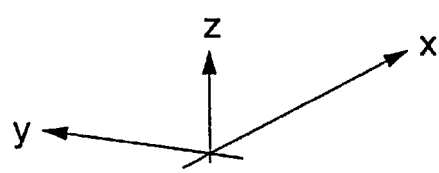
FIG. 10b schematically illustrates a cross-sectional view of a touch screen device according to the seventh embodiment of the present invention.

FIG. 10a schematically illustrates a perspective view of a touch screen device 1709 according to a seventh embodiment of the present invention. FIG. 10b illustrates a cross-sectional view of the touch screen device 1709 in a plane which is perpendicular to the x-direction as defined in FIG. 10a. An U-shaped touch screen 1711 having an active surface area 1712 is provided with a three mode toggling pivot button 1755.

Figure 10B:
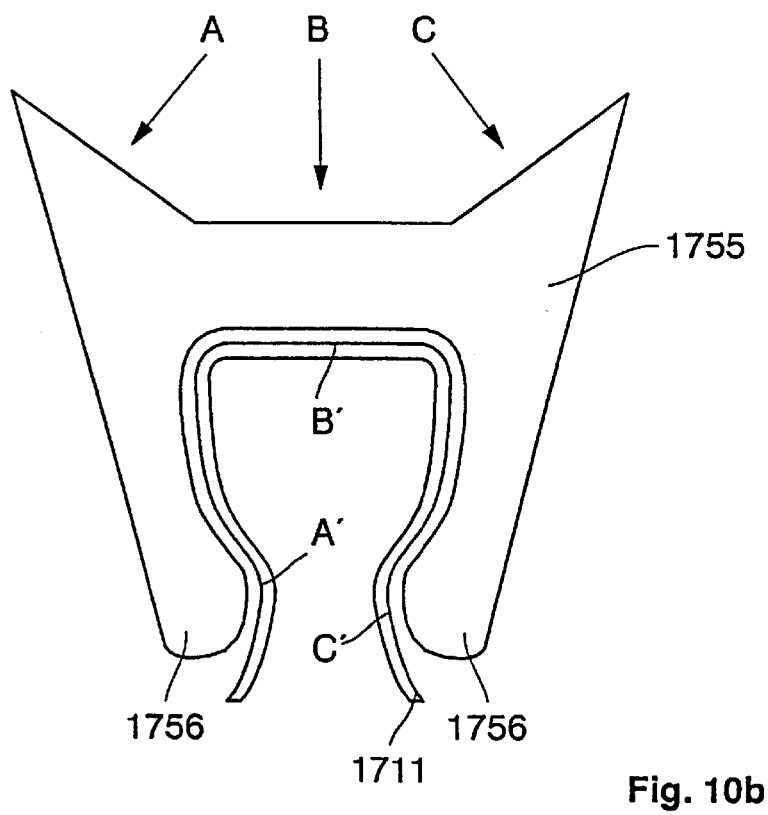

The touch screen 1711 is similar to the touch screen of the first embodiment of the present invention. The pivot button 1755 is made of a resilient material, such as rubber, or a non-resilient material, such as metal or plastic. The form of the pivot button 1755 is tied to the form of the touch screen 1711 such that the pivot button 1755 can be locked-on to the touch screen 1711. In the case of the embodiment illustrated in FIG. 10, the "legs" of the U-shaped touch screen 1711 are given a rounded shape and portions 1756 of the pivot button 1755 are tied to the rounded shape of the touch screen 1711. The pivot button 1755 can be snapped-on to the touch screen 1711 in the case it is made of a resilient material such as rubber. This allows the pivot button 1755 to be easily assembled with the touch screen 1711.

In use, the pivot button 1755 experiences forces from a user (not shown) for example through the finger of the user. These forces are symbolized by the arrows A, B and C in FIG. 10b. The pivot button 1755 transfers the forces to the touch screen 1711 in the form of a "touch" or an increased pressure. In case of the force symbolized A "touch" or an increased pressure is experienced by the touch screen 1711 in the region symbolized by A'. In a corresponding way, the forces symbolized B and C gives rise to a "touch" or an increased pressure in the regions symbolized B' and C', respectively.

It is also possible to allow the pivot button 1755 to slide along the U-shaped structure by the influence of a user. Such movement is indicated in FIG. 10a by the arrows symbolized by X' and X'. A system (not shown) using the input device may use the position of a pivot button 1755 along the U-shaped structure as an input signal and adjust its functionality accordingly. Alternatively, several pivot buttons (not shown) may be placed on the same touch screen.

In an alternative embodiment the pivot button 1755 may be provided with small protruding elements (not shown) which physically separate the major part of the surface of the pivot button 1755 faced towards the touch screen 1711 from the surface of the touch screen. In this alternative embodiment it is easier to use a very sensitive touch screen or a touch screen which is activated already when an object is at a small distance from the touch screen.

Instead of the specific U-shaped structure illustrated in FIG. 10a, the pivot button 1755 may be physically supported by an arrangement including at least one rail (not shown) which extends along a ridge-shaped structure.

It should be understood that a touch screen similar to the touch screen of the second embodiment may also be used together with an additional part. In this case the additional part is tied to the inner shape of the U-shaped structure rather than to the outer shape as was the case in the seventh embodiment.

Figure 11A:
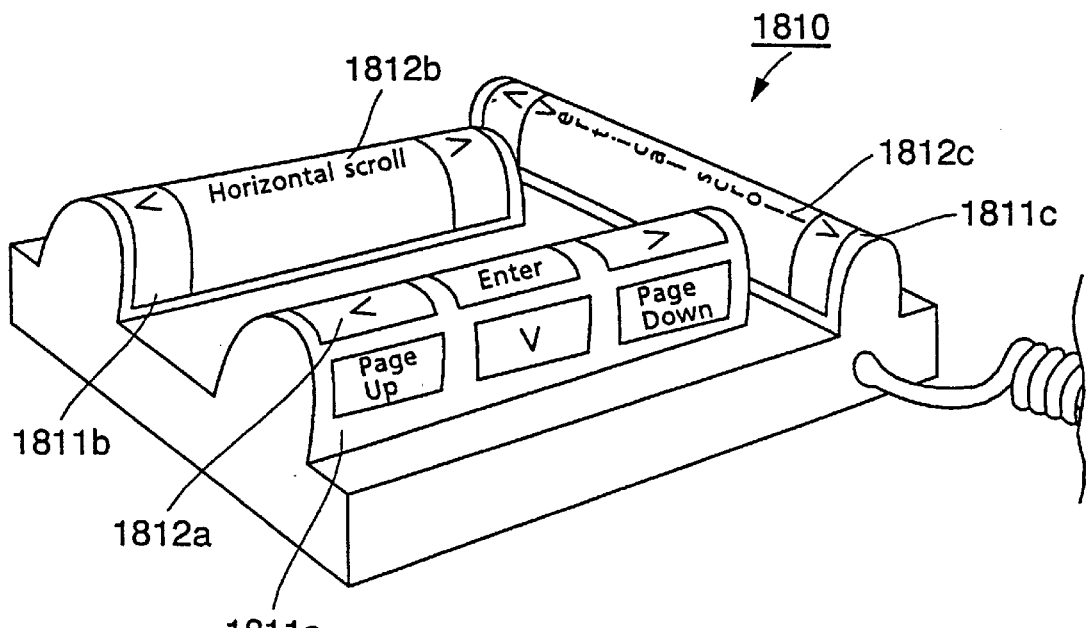
FIG. 11a schematically illustrates a perspective view of an input device according to the eighth embodiment of the present invention.
Figure 11B:
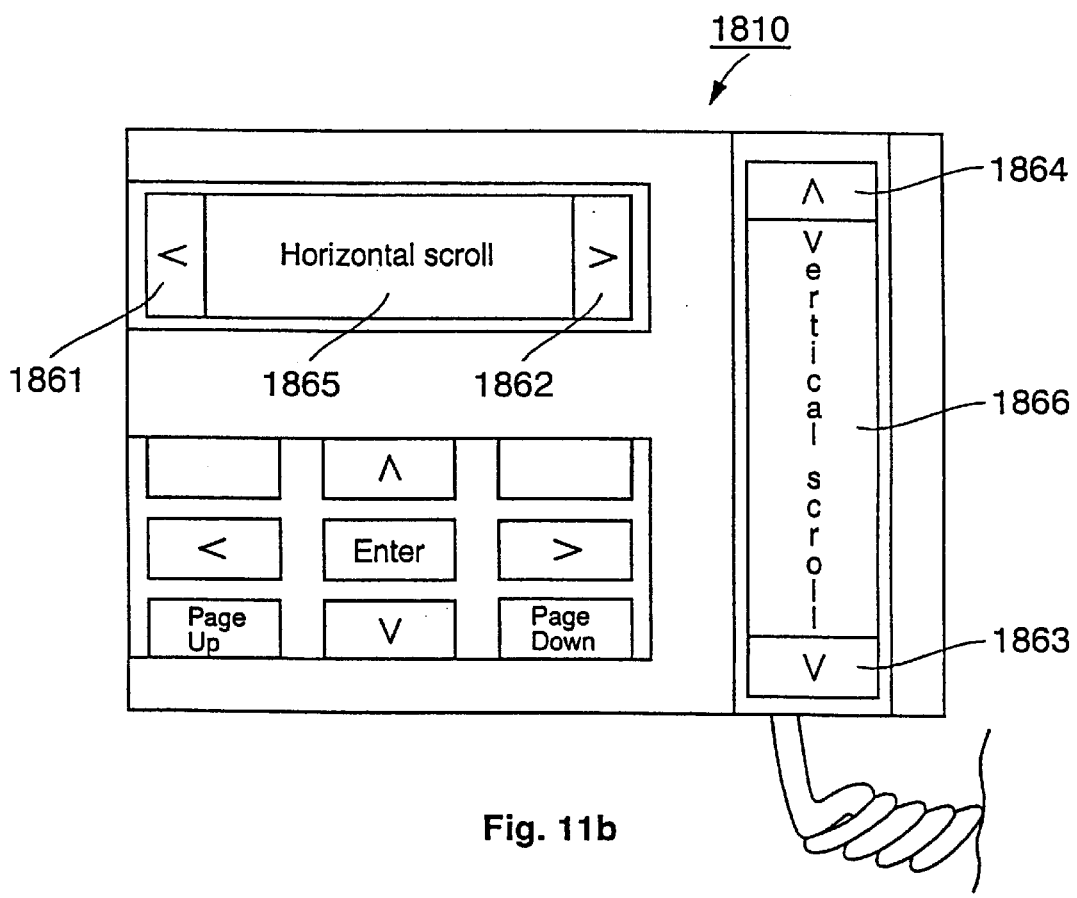
FIG. 11b schematically illustrates a front view of an input device according to the eighth embodiment of the present invention.

FIG. 11a and FIG. 11b schematically illustrate a perspective view and a top view, respectively, of an input device according to a eighth embodiment of the present invention. An input device 1810 comprises three touch screens 1811a, 1811b, 1811c having active surface areas 1812a, 1812b, 1812c. In this embodiment three U-shaped touch screens 1811a, 1811b, 1811c in accordance with the first embodiment are provided and the active surface areas 1812a, 1812b, 1812c are divided into predetermined regions. These regions correspond to a cursor control functionality: "left", "right", "up", "down", "page-up", "page-down" and "enter" and a scroll bar functionality: "horizontally-left" 1861, "horizontally-right" 1862, "vertically-up" 1864 and "vertically-down" 1863. The scroll bar also comprises two regions 1865, 1866 where the input device gives an output signal which is linearly dependent on the position of a "touch" along the U-shaped structure.

Each of the touch screens 1811a, 1811b, 1811c may be of the type which is activated already when an object is at a small distance from the active surface area 1812a, 1812b, 1812c of the touch screen. Such a touch screen may use a capacitive technology as described above. The fact that the touch screen is activated before the user is given a tactile feedback of the position of the object on the active surface area of the touch screen does not give rise to any functional problems when this input device is used since the scroll-bar functionality and the cursor control functionality (possibly except for the "enter" functionality) do not affect more than the selection of a window to be viewed or the position of a cursor, respectively.

It should be understood that other kinds of functionality may be used or incorporated in the input device without departing from the scope of the present invention.

A user of the input device 1810 receives tactile feedback from the U-shaped structures when he slides the tip of his finger over the active surface areas. This tactile feedback gives the user information about the position of the tip of the finger on the active surface areas.

Figure 12A:
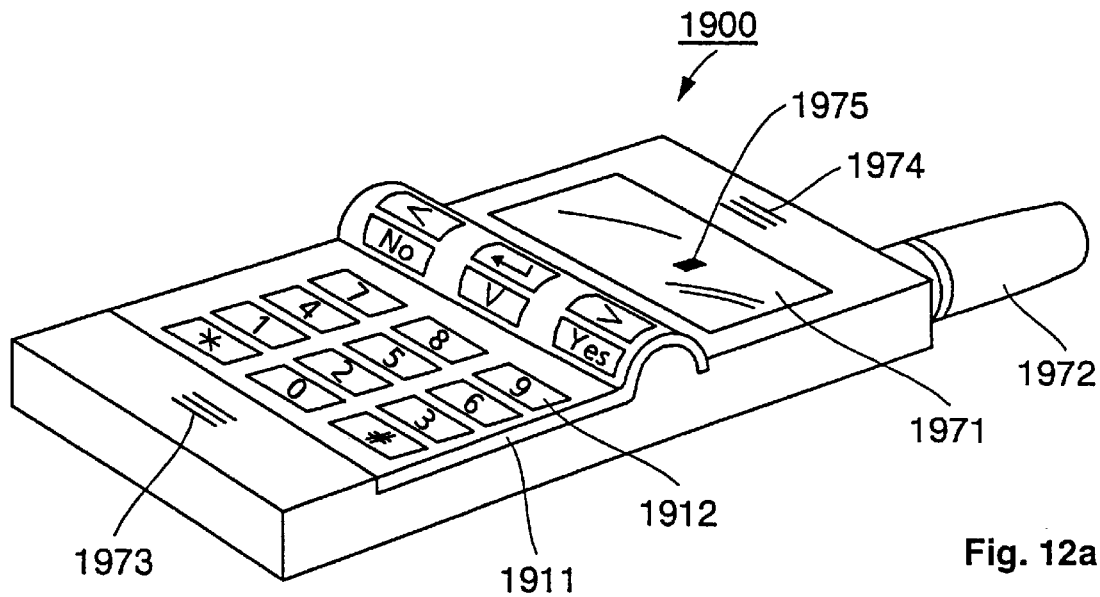
FIG. 12a schematically illustrates a perspective view of a mobile phone according to the ninth embodiment of the present invention.
Figure 12B:
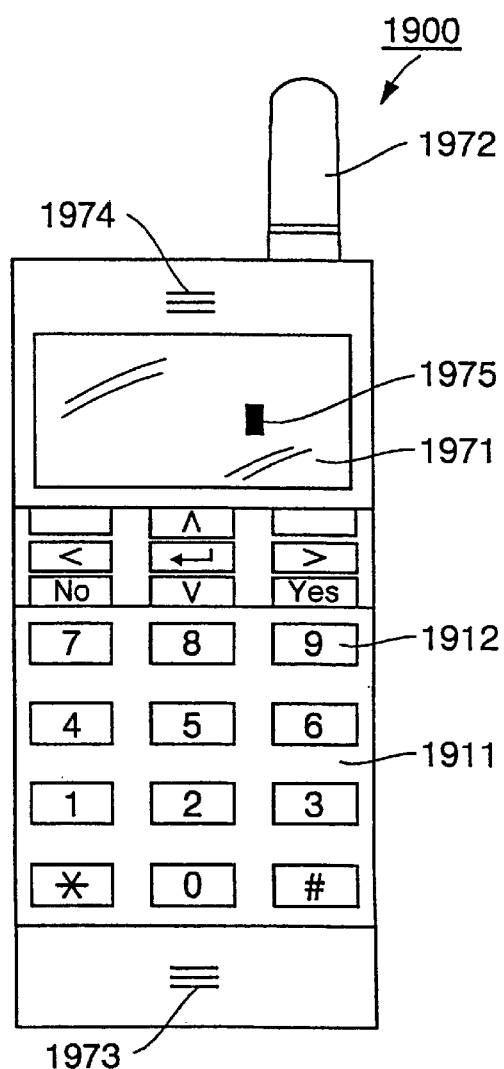
FIG. 12b schematically illustrates a top view of a mobile phone according to the ninth embodiment of the present invention.

FIG. 12a and FIG. 12b schematically illustrate a perspective view and a top view, respectively, of a mobile phone 1900 according to a ninth embodiment of the present invention. A mobile phone 1900 comprises a touch screen 1911, a display 1971, an antenna 1972, an opening to a microphone 1973 and an opening to a loudspeaker 1974. The touch screen 1911, which is similar to the touch screen discussed above in the sixth embodiment, has an active surface area 1912. The touch screen 1911 is used to allow a user to input data to the mobile phone 1900. This data may be data which the mobile phone 1900 has requested visually via the display 1971 or audibly via the loudspeaker 1974. The mobile phone 1900 may also display a cursor 1975 on the display 1971 and the user may touch the touch screen 1911 at predetermined regions to control the cursor position or to make a functional choice.

The U-shaped part of the touch screen 1911 allows a user of the mobile phone 1900, due to the tactile feedback provided by the touch screen 1911 as has been discussed above, to inform himself about the position of his finger when the user slides his finger in at least one direction over the active surface area 1912 of the touch screen 1911.

Furthermore, the surface area occupied by the touch screen 1911 on the mobile phone 1900 is smaller than the surface area which would have been required if the active surface area of the touch screen would have extended in only two physical dimensions. This can be realized without making the predetermined regions on the active surface area smaller.

It should be understood that any one of the touch screens or input devices disclosed above may be used as a touch screen or an input device in a mobile phone.

What is claimed is:

1. A touch screen device comprising:
a touch screen having one common active surface area which extends in three physical dimensions, said touch screen produces an output signal when said active surface area is activated by the positioning of an object at the surface of said active surface area, said output signal comprises information about the position of said object within said active surface area, said touch screen is characterized in that at least a part of said active surface area has a form in said three physical dimensions such that, when a user slides the object over the active surface area, the tactile feedback gives information to said user about the position of the object within said active surface area;
the touch screen including a ridge shaped screen portion; and
a pivot button for interaction between the tip of a finger of a user and said active surface area of said touch screen wherein the form of the pivot button is tied to the form of the active surface area of said touch screen such that the pivot button is slidable along said screen portion and is locked-on to the touch screen.

2. A touch screen device according to claim 1 wherein said pivot button is made of a resilient material.

3. A touch screen device according to claim 1 wherein said pivot button is assembled with said touch screen by a snap-on operation.

4. A touch screen device according to claim 1 wherein said active surface area comprises at least one region in which the active surface area extends in substantially two physical dimensions only.

5. A cursor control device comprising a touch screen device according to claim 1.

6. An input device comprising a touch screen device according to claim 1.

7. A mobile phone comprising a touch screen device according to claim 1.

8. Use of a touch screen device according to claim 1 for entering information to a system wherein said system executes at least one function in response to a signal from said touch screen initiated by the activation of said touch screen.

9. Use of a touch screen device according to claim 8 wherein said system is connected to a display and wherein said at least one function of said system is executed on the activation of a predetermined sensitive region of said touch screen when a predetermined symbol, icon or text is displayed by said system on said display.

10. Use of a touch screen device according to claim 9 wherein said display is located adjacent to said touch screen.

11. Use of a touch screen device according to claim 9 wherein said touch screen is located above said display such that the user of said touch screen views at least a part of said display through said touch screen.

12. A touch screen device, comprising:

a touch screen having an active surface area adapted to produce an output signal when pressure is applied to a portion of said touch screen, said output signal comprising information about the position of said pressure applied to said active surface area;

said touch screen including a ridge shaped screen portion extending in three physical dimensions; and a pivot button slidably engaged with said ridge shaped screen portion for applying pressure to a portion of said active surface to cause the device to generate an output signal.

13. A touch screen device according to claim 12, wherein: the pivot button is made of a resilient material.

14. A touch screen device according to claim 12, wherein: the pivot button is adapted to be connected to the ridge shaped portion using snap-fit techniques.

15. A touch screen device according to claim 12, wherein: a portion of the active surface area extends solely in two dimensions.

16. A cursor control device comprising a touch screen device according to claim 12.

17. An input device comprising a touch screen device according to claim 12.

18. A mobile phone comprising a touch screen according to claim 12.

* * * * *